(12) United States Patent
Huang

(10) Patent No.: US 6,887,508 B2
(45) Date of Patent: May 3, 2005

(54) PROTEIN STABILIZING AGENT

(75) Inventor: Xiaolin Huang, Ballwin, MO (US)

(73) Assignee: Solae, LLC, St. Louis, MO (US)

( * ) Notice: Subject to any disclaimer, the term of this patent is extended or adjusted under 35 U.S.C. 154(b) by 584 days.

(21) Appl. No.: 10/079,342

(22) Filed: Feb. 20, 2002

(65) Prior Publication Data

US 2003/0157236 A1 Aug. 21, 2003

(51) Int. Cl.⁷ .......................... A23L 1/05; A23L 1/0532; A23L 1/0524; A23L 2/02
(52) U.S. Cl. ....................... 426/573; 426/573; 426/575; 426/577; 426/590; 426/599
(58) Field of Search ................................ 426/590, 599, 426/573, 575, 577, 656

(56) References Cited

U.S. PATENT DOCUMENTS

| | | | |
|---|---|---|---|
| 4,276,311 A | 6/1981 | Burrows et al. ............... 426/56 |
| 4,391,830 A | 7/1983 | Gudnason et al. ............. 426/43 |
| 4,656,044 A | 4/1987 | Sugimoto et al. ........... 426/592 |
| 4,980,182 A | 12/1990 | Kwon et al. ................. 426/130 |
| 4,988,530 A | 1/1991 | Hoerstein et al. ........... 426/577 |
| 5,260,085 A | 11/1993 | Wisler et al. ................ 426/584 |
| 5,286,511 A | 2/1994 | Klavons et al. ............. 426/577 |
| 5,342,643 A | 8/1994 | Wolf et al. .................. 426/590 |
| 5,356,654 A | 10/1994 | Speirs et al. ................ 426/575 |
| 5,376,396 A | 12/1994 | Clark .......................... 426/573 |
| 5,385,748 A | 1/1995 | Bunger ........................ 426/590 |
| 5,529,796 A | 6/1996 | Gobbo et al. ............. 426/330.3 |
| 5,607,714 A | 3/1997 | Connolly ..................... 426/599 |
| 5,648,112 A | 7/1997 | Yang et al. .................. 426/580 |
| 5,690,975 A | 11/1997 | Akahoshi et al. ............. 426/34 |
| 5,861,178 A | 1/1999 | Burgin ........................ 424/499 |
| 5,886,190 A | 3/1999 | Barey ......................... 426/573 |
| 6,083,540 A | 7/2000 | Christensen et al. .......... 426/50 |
| 6,171,633 B1 | 1/2001 | Dulebohn et al. .......... 426/580 |
| 6,221,419 B1 | 4/2001 | Gerrish ....................... 426/577 |
| 2003/0021878 A1 * | 1/2003 | Nunes et al. ................ 426/601 |
| 2003/0035880 A1 * | 2/2003 | Heisey et al. ............... 426/601 |

FOREIGN PATENT DOCUMENTS

| | | |
|---|---|---|
| DE | 19536097 A1 | 4/1997 |
| EP | 0 639335 A1 | 2/1995 |
| WO | WO01/96590 A2 | 12/2001 |

OTHER PUBLICATIONS

Toft, *Interactions Between Pectins and Alginates*, Prog. Fd. Nutri. Sci., vol. 6 89–96 (1982).
*Drinks and Desserts, Neutral and Acid based on Soya Milk and Soy Protein Isolates*, Glahn, Copenhagen Pectin Factory Ltd, pp. 31–34 (1984).
Circle, Soy Protein in Dairy–type foods, Beverages, confections, Dietary, and other foods, J. Am. Oil Chemist's Soc., Jan. 1974, vol. 51.

\* cited by examiner

*Primary Examiner*—Helen Pratt
(74) *Attorney, Agent, or Firm*—Richard B. Taylor

(57) ABSTRACT

The present invention relates to a protein stabilizing agent for stabilizing a protein suspension in an aqueous acidic liquid such as a juice. The protein stabilizing agent is comprised of a high methoxyl pectin and a propylene glycol alginate. The present invention also includes compositions for suspension in an aqueous acidic liquid comprising a protein material and a protein stabilizing agent that contains a high methoxyl pectin and a propylene glycol alginate. The invention further includes aqueous acidic protein suspensions and methods of producing such suspensions, where the suspensions have a pH of from 3.0 to 5.5 and contain a stabilized suspension of a protein material and a protein stabilizing agent containing a high methoxyl pectin and a propylene glycol alginate therein.

17 Claims, No Drawings

PROTEIN STABILIZING AGENT

FIELD OF THE INVENTION

The present invention relates to aqueous acid stabilized protein compositions, and particularly to acidic beverages containing stabilized protein suspensions therein, and processes for producing such beverages.

BACKGROUND OF THE INVENTION

Juices and other acidic juice-like beverages are popular commercial products. Consumer demand for nutritional healthy beverages has led to the development of nutritional juice or juice-like beverages containing protein. The protein provides nutrition in addition to the nutrients provided by the components of the beverage. Recently it has been discovered that certain proteins have specific health benefits beyond providing nutrition. For example, soy protein has been recognized by the United States Food and Drug Administration as being effective to lower blood cholesterol concentrations in conjunction with a healthy diet. In response, there has been a growing consumer demand for acidic juice-like beverages containing proteins that provide such specific health benefits.

A hurdle to adding protein to acidic beverages, however, is the relative insolubility of proteins in an aqueous acidic environment. Most commonly used proteins, such as soy proteins and casein, have an isoelectric point at an acidic pH. Thus, the proteins are least soluble in an aqueous liquid at or near the pH of acidic beverages. For example, soy protein has an isoelectric point at pH 4.5 and casein has an isoelectric point at a pH of 4.7, while most common juices have a pH in the range of 3.7 to 4.0. As a result, protein tends to settle out as a sediment in an acidic protein-containing beverage—an undesirable quality in a beverage.

Protein stabilizing agents that stabilize proteins as a suspension in an aqueous acidic environment are used to overcome the problems presented by protein insolubility. Pectin is a commonly used protein stabilizing agent. For example, Klavons et al. (U.S. Pat. No. 5,286,511) provide a beverage such as orange juice that is clouded by a suspension of soy protein particles, where the protein particles are prevented from aggregating to the point of settling out by pectin. Pectin inhibits the protein from settling by adsorbing to individual protein particles and imparting an overall negative charge to the protein particles, resulting in repulsion of the particles from one another, and thereby preventing the protein particles from aggregating and settling out of the suspension. Pectin also increases the viscosity of the beverage, which helps stabilize protein particles against gravitational forces.

Pectin, however, is an expensive food ingredient, and manufacturers of aqueous acidic beverages containing protein desire less expensive stabilizers, where the amount of required pectin is either reduced or removed in favor of less expensive stabilizing agents.

SUMMARY OF THE INVENTION

In one aspect, the present invention is a protein stabilizing agent for stabilizing a protein material in an aqueous acidic medium. The protein stabilizing agent is comprised of a high methoxyl pectin and a propylene glycol alginate in a ratio of from 0.5:1 to 3.5:1 high methoxyl pectin to propylene glycol alginate, by weight.

In another aspect, the present invention is a composition for suspension in an aqueous acidic liquid. The composition is comprised of a protein material that is selected from a soy protein material, casein, corn gluten, zein, and wheat gluten, and a protein stabilizing agent that is comprised of a high methoxyl pectin and a propylene glycol alginate. In a preferred embodiment the protein material is complexed with the high methoxyl pectin and propylene glycol alginate components of the protein stabilizing agent.

In a further aspect, the present invention is a composition of an acidic aqueous liquid having a hydrated protein material suspended in the liquid. The acidic aqueous liquid has a pH of from 3.0 to 5.5. A protein stabilizing agent comprising a high methoxyl pectin and a propylene glycol alginate is present in the liquid, where the combined amount of the high methoxyl pectin and the propylene glycol alginate in the protein stabilizing agent is effective to maintain the protein material suspended in the liquid. In a preferred embodiment, the protein material is either casein or a soy protein material.

In another aspect, the invention is a method for stabilizing protein in an aqueous acidic liquid. A hydrated protein material, a high methoxyl pectin, and a propylene glycol alginate are mixed in an aqueous acidic liquid having a pH of from 3.0 to 5.5. A sufficient amount of the high methoxyl pectin and the propylene glycol alginate are mixed with the hydrated protein in the aqueous acidic liquid to maintain the hydrated protein material suspended in the aqueous acidic liquid.

In yet another aspect, the invention is a method for forming a stable suspension of protein material in an acidic juice. A protein material is hydrated, and the hydrated protein material is contacted with a stabilizing agent in an acidic juice. The stabilizing agent is comprised of a high methoxyl pectin and a propylene glycol alginate, and the amount of stabilizing agent contacted with the protein material in the juice is effective to stabilize the protein in the juice.

DETAILED DESCRIPTION OF THE INVENTION

The present invention is the discovery that a protein stabilizing agent formed of a high methoxyl pectin and a propylene glycol alginate is more effective at stabilizing protein materials as a suspension in an aqueous acidic liquid, particularly a juice-type beverage, than pectin or other known protein stabilizing agents or known combinations of protein stabilizing agents. As a result, less total stabilizing agent is necessary to achieve superior protein suspension in an aqueous acidic liquid than is currently possible with known stabilizing agents or known combinations thereof when the stabilizing agent is formed of a combination of a high methoxyl pectin and a propylene glycol alginate.

Two particularly significant benefits of the novel protein stabilizing agent of the present invention are derived from its effectiveness as a protein stabilizing agent. First, nutritional acidic protein containing beverages can be formulated that have a lower viscosity than currently available acidic protein containing beverages. Protein stabilizing agents (e.g. pectin) increase the viscosity of an acidic protein containing beverage. It is difficult to obtain a low viscosity acidic protein containing beverage such as a fruity juice since use of conventional protein stabilizers results in a beverage having a thicker mouthfeel than low viscosity beverages such as fruity juices. The high methoxyl pectin/propylene glycol alginate protein stabilizing agent of the present invention is more effective at stabilizing protein in an acidic beverage than known protein stabilizers, therefore, less of the novel protein stabilizing agent is required to stabilize the protein as a suspension in the beverage to inhibit protein sedimentation. A low viscosity acidic protein containing beverage can be produced with the novel protein stabilizing agent since less of the protein stabilizing agent is required to stabilize the protein.

Second, a significant economic advantage can be realized with the novel protein stabilizing agent, since significantly less of the high methoxyl pectin/propylene glycol alginate protein stabilizer is required to stabilize protein as a suspension in an acidic liquid than conventional protein stabilizers. Protein stabilizing agents such as pectin are very expensive. As a result, the cost of the protein stabilizing agent accounts for a significant percentage of the ingredient cost of a protein containing acidic beverage. That cost can be substantially reduced with the present high methoxyl pectin/propylene glycol alginate protein stabilizing agent since significantly less of the present protein stabilizing agent is required to stabilize the protein in the acidic beverage.

The present invention, therefore, includes a protein stabilizing agent composition for stabilizing protein in an aqueous acidic liquid comprising a high methoxyl pectin and a propylene glycol alginate. As used herein, the term pectin means a neutral hydrocolloid that consists mainly of partly methoxylated polygalacturonic acid. The term "high methoxyl pectin" as used herein means a pectin having a degree of methoxyl esterification of fifty percent (50%) or greater. High methoxyl pectins useful in the present invention are commercially available. A preferred commerically available high methoxyl pectin is Hercules YM100L available from Copenhagen Pectin A/S, a division of Hercules Incorporated, DK-4623, Lille Skensved, Denmark. Hercules YM100L contains about 56% galacturonic acid, where about 72% (± 2%) of the galacturonic acid is methylated.

As used herein, the term propylene glycol alginate refers to a partly neutralized alginic acid esterified with propylenoxide. Alginic acids may be extracted from brown seaweeds, and may be partly neutralized to sodium, potassium, or ammonium salts. Due to the esterification of alginic acid with propylenoxide, propylene glycol alginate is a synthetic alginate, and not a naturally occuring alginate such as sodium alginate. Propylene glycol alginates useful in the present invention are commercially available. A preferred commercially available propylene glycol alginate is Kelcoloid S available from ISP Alginates, Ladyburn Works, Girvan, Ayrshire, Scotland KA26 9JN, United Kingdom. Kelcoloid S contains 40% guluronic acid and 60% mannuronic acid, where about 80% of each acid is esterified.

The relative amounts of high methoxyl pectin and propylene glycol alginate of the protein stabilizing agent may vary. A sufficient amount of the propylene glycol alginate, however, should be present to improve the protein stabilizing effects of the combined high methoxyl pectin and propylene glycol alginate relative to a pectin alone. Preferably, the high methoxyl pectin and the propylene glycol alginate are present in the protein stabilizing agent composition in a ratio of from 0.5:1 to 3.5:1 high methoxyl pectin to propylene glycol alginate, by weight.

The protein stabilizing agent of the present invention may be formed by blending a high methoxyl pectin together with a propylene glycol alginate. The high methoxyl pectin and propylene glycol aliginate may be dry-blended, or may be incorporated together in an aqueous solution for addition to a liquid containing a suspended protein material to be stabilized by the protein stabilizing agent.

The present invention further includes a composition for suspension in an acidic liquid that will form a stable protein suspension in the liquid. The suspendible composition includes a protein material and a protein stabilizing agent comprised of a high methoxyl pectin and a propylene glycol alginate.

The protein material of the suspendible composition may be any vegetable or animal protein that is at least partially insoluble in an aqueous acidic liquid, preferably in an aqueous acidic liquid having a pH of from 3.0 to 5.5, and most preferably in an aqueous acidic liquid having a pH of from 3.5 to 4.5. As used herein a "partially insoluble" protein material is a protein material that contains at least 10% insoluble material, by weight of the protein material, at a specified pH. Preferred protein materials useful in the composition of the present invention include soy protein materials, casein or caseinates, corn protein materials—particularly zein, and wheat gluten.

Soy protein materials useful in the suspendible composition of the present invention include soy protein isolates or other soy protein products from which hulls, hypocotyls, and insoluble carbohydrates and polysaccharides have been removed. One soy protein material useful in the composition is the novel soy protein product described in U.S. Pat. No. 5,858,449, which is incorporated herein by reference. The novel soy protein product is produced by mixing high sucrose, low stachyose soy flakes, water and caustic in an agitated, heated tank for protein and sugar extraction. Once thoroughly heated and agitated the mixture is fed to a first centrifugal separator. The liquor is sent to a holding tank, and the centrate is mixed with water in a separate tank where it is heated and agitated. The mixed centrate is fed to a second centrifugal separator, and the liquor from the second separator is combined with the liquor from the first separator. The combined liquors are pasteurized in a heat exchanger, evaporated to a sufficient solids composition for economical spray drying, and spray dried to provide the hovel soy protein product.

The most preferred soy protein material useful in the suspendible protein composition of the present invention is a soy protein isolate. A soy protein isolate is derived by processing whole soybeans to separate soy protein from other soy materials such as the hull, germ, fats and oils, and carbohydrates. As used herein, the term "soy protein isolate" refers to a soy protein material containing at least 90% soy protein by weight on a moisture-free basis.

To form a soy protein isolate, whole soybeans are cracked, dehulled, degermed, and defatted according to conventional procedures in the art to form soy flakes, soy flour, soy grits, or soy meal, which are commercially available starting materials for the production of soy protein isolates. The soy flakes, soy flour, soy grits, or soy meal is/are extracted with an aqueous alkaline solution, typically a dilute aqueous sodium hydroxide solution having a pH of from 7.5 to 11.0, to extract protein from insolubles, primarily insoluble carbohydrates. An aqueous alkaline extract containing the protein is subsequently separated from the insolubles, and the extract is then treated with an acid to lower the pH of the extract to around the isoelectric point of the soy protein, preferably to a pH of from 4.0 to 5.0, and most preferably to a pH of from 4.4 to 4.6. The soy protein precipitates from the acidified extract, and is separated from the extract. The separated protein may be washed with water to remove residual soluble carbohydrates and ash from the protein material. The separated protein is then dried using conventional drying means to form a soy protein isolate. Soy protein isolates are commerically available from Protein Technologies International, for example, as SUPRO® 710 and SUPRO® 720.

Modified soy protein materials may also be used as the protein material of the suspendible composition. Soy protein materials may be modified by several techniques known in the art such as protein hydrolysis, by enzyme or by acid treatment, and deamidation by enzymatic treatment.

A particularly preferred modified soy protein material is a soy protein isolate that has been enzymatically hydrolyzed and deamidated under conditions that expose the core of the proteins to enzymic action as described in European Patent No. 0 480 104 B 1, which is incorporated herein by reference. Briefly, the modified protein isolate material disclosed in European Patent No. 0 480 104 B 1 is formed by: 1) forming an aqueous slurry of a soy protein isolate; 2) adjusting the pH of the slurry to a pH of from 9.0 to 11.0; 3) adding between 0.01 and 5% of a proteolytic enzyme to the slurry (by weight of the dry protein in the slurry); 4) treating the alkaline slurry at a temperature of 10° C. to 75° C. for a time period effective to produce a modified protein material having a molecular weight distribution (Mn) between 800 and 4000 and a deamidation level of between 5% to 48% (typically between 10 minutes to 4 hours); and deactivating the proteolytic enzyme by heating the slurry above 75° C. The modified protein material disclosed in European Patent No. 0 480 104 B 1 is commercially available from Protein Technologies International, Inc of St. Louis, Mo.

Casein protein materials useful in the suspendible composition are prepared by coagulation of a curd from skim milk. The casein is coagulated by acid coagulation, natural souring, or rennet coagulation. To effect acid coagulation of casein, a suitable acid, preferably hydrochloric acid, is added to milk to lower the pH of the milk to around the isoelectric point of the casein, preferably to a pH of from 4.0 to 5.0, and most preferably to a pH of from 4.6 to 4.8. To effect coagulation by natural souring, milk is held in vats to ferment, causing lactic acid to form. The milk is fermented for a sufficient period of time to allow the formed lactic acid to coagulate a substantial portion of the casein in the milk. To effect coagulation of casein with rennet, sufficient rennet is added to the milk to precipitate a substantial portion of the casein in the milk. Acid coagulated, naturally soured, and rennet precipitated casein are all commercially available from numerous manufacturers or supply houses.

Corn protein materials that are useful in the suspendible composition include corn gluten meal, and most preferably, zein. Corn gluten meal is obtained from conventional corn refining processes, and is commercially available. Corn gluten meal contains about 50% to about 60% corn protein and about 40% to about 50% starch. Zein is a commercially available purified corn protein which is produced by extracting corn gluten meal with a dilute alcohol, preferably dilute isopropanol.

Wheat protein materials that are useful in the suspendible protein composition of the present invention include wheat gluten. Wheat gluten is obtained from conventional wheat refining processes, and is commercially available.

The protein stabilizing agent used in the suspendible composition is the protein stabilizing agent described above that is comprised of a high methoxyl pectin and a propylene glycol alginate. A preferred commerically available high methoxyl pectin is Hercules YM100L available from Copenhagen Pectin A/S. Hercules YM100L contains about 56% galacturonic acid, where about 72% (± 2%) of the galacturonic acid is methylated. A preferred commercially available propylene glycol alginate is Kelcoloid S available from ISP Alginates. Kelcoloid S contains 40% guluronic acid and 60% mannuronic acid, where about 80% of each acid is esterified.

The high methoxyl pectin and the propylene glycol alginate of the protein stabilizing agent are present in the suspendible composition in a combined amount effective to maintain the protein material of the composition suspended in an aqueous acidic liquid having a pH near the isoelectric point of the protein material (e.g. pH 3.0 to 5.5) when the composition is mixed in the aqueous acidic liquid in an amount effective to provide a protein concentration in the liquid of from 0.01% to 8%, by weight. Preferably the amount of the protein stabilizing agent in the suspendible composition (the combined amount of the high methoxyl pectin and the propylene glycol alginate) is from 0.1:1 to 0.7:1, by weight, protein stabilizing agent to protein material.

The relative amounts of high methoxyl pectin and propylene glycol alginate of the protein stabilizing agent may vary. A sufficient amount of the propylene glycol alginate, however, should be present to improve the protein stabilizing effects of the combined high methoxyl pectin and propylene glycol alginate relative to a pectin alone. Preferably, the high methoxyl pectin and the propylene glycol alginate are present in the suspendible composition in a ratio of from 0.5:1 to 3.5:1 high methoxyl pectin to propylene glycol alginate, by weight.

The suspendible composition may be formed merely by blending the protein material with appropriate amounts of the high methoxyl pectin and the propylene glycol alginate of the protein stabilizing agent. For example, the protein material may be dry-blended with the high methoxyl pectin and the propylene glycol alginate in a conventional blender or mixer.

In a particularly preferred embodiment, the protein material is complexed with the high methoxyl pectin and the propylene glycol alginate of the protein stabilizing agent of the suspendible composition. In order to complex the protein material with the high methoxyl pectin and propylene glycol alginate, the protein material, high methoxyl pectin and propylene glycol alginate are dispersed and mixed in an aqueous solution having a pH of greater than 5.5 or less than 3.0, most preferably water or a dilute aqueous sodium hydroxide solution, to hydrate the protein and promote interaction between the protein material and the components of the protein stabilizing agent. Preferably the aqueous mixture is heated to 170° F. to increase hydration of the protein material and promote interactions between the protein material and the high methoxyl pectin and propylene glycol alginate. The protein material, high methoxyl pectin and propylene glycol alginate are mixed for a time sufficient to hydrate the protein material and thoroughly mix the components, preferably for a period of 5 to 30 minutes. After the protein material and protein stabilizing agent components are thoroughly mixed, the aqueous mixture is dewatered to provide a dry suspendible composition in which the protein material is complexed—either physically, chemically, or both—with the high methoxyl pectin and the propylene glycol alginate of the protein stabilizing agent. Preferably the aqueous mixture is dewatered by spray drying or flash drying, although other methods of drying may be utilized.

The present invention also includes an aqueous acidic suspended protein composition comprising an aqueous acidic liquid in which a protein material is suspended, and in which a protein stabilizing agent comprising a high methoxyl pectin and a propylene glycol alginate stabilizes the protein as a suspension in the liquid by inhibiting the sedimentation of the protein from the liquid. The protein stabilizing agent is present in the aqueous acidic suspended protein composition in an amount effective to maintain the protein material suspended in the liquid.

The aqueous acidic liquid of the aqueous acidic suspended protein composition of the invention may be any type of aqueous acidic liquid, either comestible or non-comestible depending on the intended use for the liquid. Preferably, the liquid is an acidic beverage for human consumption. The aqueous acidic liquid has a pH of from 3.0 to 5.5, more preferably the liquid has a pH of from 3.3 to 5.0, and most preferably the liquid has a pH of from 3.5 to 4.5.

In one embodiment of the invention, the aqueous acidic liquid is a fruit or vegetable juice. Preferred fruit and vegetable juices include apple juice, grape juice, orange juice, carrot juice, lemon juice, lime juice, grapefruit juice, pineapple juice, cranberry juice, peach juice, pear juice, celery juice, cherry juice, tomato juice, passion fruit juice, and juice blends. The fruit and vegetable juices that may be employed in the invention may be obtained from a selected fruit or vegetable by crushing, squeezing, or pressing the fruit or vegetable. The resulting juice may be filtered, strained or passed through a sieve, resin bed, clay or diatomaceous earth bed or filters to remove juice pulp and other materials that are insoluble in the juice, as desired.

In another embodiment of the invention, the aqueous acidic liquid may be formed of water and an acidulent, and, if desired, flavoring, coloring agents, nutrients, and sweeteners. Citric acid, phosphoric acid, lactic acid, ascorbic acid, and other edible acids may be used as acidulents to adjust the pH of the water to the desired pH. The type of acid used as the acidulent should be selected to provide the desired organoleptic properties to the liquid since the type of acid used may significantly affect these properties. For example, lactic acid tends to impart a fermented character to the liquid, citric acid provides a sharp character, and phosphoric acid provides a milder flavor. A blend of acids may be used as the acidulent in order to obtain the desired flavor profile.

Flavoring, coloring agents, nutrients, defoamers, and sweeteners are preferably included with the water and acidulent to provide the liquid with a desired flavor, color, and nutritional profile. The flavoring agents that may be used to flavor the liquid include both natural and artificial flavors. In a preferred embodiment, the flavoring agent is a concentrated fruit or vegetable juice added to the liquid in an amount effective to provide a juice beverage. Coloring agents that may be used to color the liquid include commercially available natural and artificial colorants for aqueous liquids. Nutrients such as vitamins and minerals may also be added to the liquid. Sweeteners may be added to provide desired flavor to the liquid. Preferred sweeteners are carbohydrates such as sucrose and fructose. A particularly preferred sweetening agent is high fructose corn syrup. Defoamers may also be added to the liquid to inhibit protein induced foaming. The flavoring and sweetening agents are included in the liquid in an amount effective to provide the desired taste to the liquid, the nutrients are included to provide the liquid with a desired nutritional profile, and the coloring agents are included in the liquid in an amount effective to provide the desired color to the liquid.

The protein material of the aqueous acidic suspended protein composition of the present invention may be any vegetable or animal protein that is at least partially insoluble in an aqueous acidic liquid, preferably in an aqueous acidic liquid having a pH of from 3.0 to 5.5, and most preferably in an aqueous acidic liquid having a pH of from 3.5 to 4.5. Preferred protein materials are soy protein materials, casein and caseinates, corn gluten, zein, and wheat gluten, which are described above.

The protein material is present in the aqueous acidic suspended protein composition in an amount capable of being suspended in the aqueous liquid. Preferably the composition contains from 0.01% to 8% of the protein material, by weight. More preferably, the composition contains from 1% to 3% of the protein material, by weight.

The protein stabilizing agent used in the aqueous acidic suspended protein composition is the protein stabilizing agent described above that is comprised of a high methoxyl pectin and a propylene glycol alginate. A preferred commerically available high methoxyl pectin is Hercules YM100L available from Copenhagen Pectin A/S. Hercules YM100L contains about 56% galacturonic acid, where about 72% (±2%) of the galacturonic acid is methylated. A preferred commercially available propylene glycol alginate is Kelcoloid S available from ISP Alginates. Kelcoloid S contains 40% guluronic acid and 60% mannuronic acid, where about 80% of each acid is esterified.

The high methoxyl pectin and the propylene glycol alginate of the protein stabilizing agent are present in the aqueous acidic suspended protein composition in a combined amount effective to maintain the protein material suspended in the aqueous acidic liquid of the composition. The amount of the protein stablizing agent effective to maintain the protein material suspended in the aqueous acidic liquid of the composition depends on the amount of protein material in the composition, where greater amounts of the protein stabilizing agent are required to stabilize greater amounts of the protein material in the composition. Preferably the amount of the protein stabilizing agent effective to maintain the protein material suspended in the aqueous acidic liquid (the combined amount of the high methoxyl pectin and the propylene glycol alginate) is from 0.1:1 to 0.7:1, by weight, of the protein stabilizing agent to the protein material.

The relative amounts of high methoxyl pectin and propylene glycol alginate of the protein stabilizing agent may vary. A sufficient amount of the propylene glycol alginate, however, should be present to improve the protein stabilizing effects of the combined high methoxyl pectin and propylene glycol alginate relative to a pectin alone. Preferably, the high methoxyl pectin and the propylene glycol alginate are present in the aqueous acidic liquid composition in a ratio of from 0.5:1 to 3.5:1 high methoxyl pectin to propylene glycol alginate, by weight.

In another embodiment, the present invention is a method of producing the composition described above of a protein material suspended in an aqueous acidic liquid with a protein stabilizing agent comprising a high methoxyl pectin and a propylene glycol alginate. Preferably the aqueous acidic liquid is a beverage for human consumption.

A protein material is selected from a soy protein material, casein, zein, or wheat gluten—each described above—for suspension in an aqueous acidic liquid. The selected protein material is initially hydrated in an aqueous solution having a pH of greater than 5.5 or less than 3.0 by adding the protein material to the aqueous solution and dispersing the protein material in the aqueous solution. Hydration of the protein material increases the solubility of the protein material in an aqueous solution. Hydration also increases the exposure and interaction of the proteins with the high methoxyl pectin and propylene glycol alginate of the protein stabilizing agent, thereby increasing the effectiveness of the protein stabilizing agent at maintaining the protein material in suspension in an acidic environment at a pH from 3.0 to 5.5.

The amount of protein hydrated in the aqueous solution is preferably from 0.01% to 8%, by weight, of the total of the desired aqueous acidic protein suspension composition. The amount of aqueous solution in which the protein is hydrated should be at least 4 times the amount of protein material, by weight. Preferably, the aqueous solution in which the protein material is hydrated is from 65% to 90%, by weight, of the total of the desired aqueous acidic protein suspension composition.

The aqueous solution in which the protein material is hydrated must have a pH significantly above or below the isoelectric point of the protein, preferably a pH of greater than 5.5 or less than 3.0, so the protein is solvated into the solution and does not precipitate out from the solution. Most preferably the aqueous solution in which the protein material is hydrated is water or an aqueous alkaline solution to maximize the solubility of the protein material in the aqueous solution and thereby maximize the hydration of the protein material.

The aqueous solution in which the protein material is hydrated is preferably heated above ambient temperature prior to, or upon, addition of the protein material to the hydrating solution to facilitate hydration of the protein material by increasing the dispersability of the protein material in the hydrating solution. Preferably the aqueous hydrating solution is heated to a temperature of from 110° F. to 170° F. (43° C.–77° C.) to aid in the dispersion of the protein material therein.

Preferably the high methoxyl pectin of the protein stabilizing agent and/or the propylene glycol alginate of the protein stabilizing agent is/are hydrated with the protein material by adding the high methoxyl pectin, the propylene glycol alginate, or both to the aqueous solution for hydrating the protein material. Hydration of the high methoxyl pectin and/or the propylene glycol alginate of the protein stabilizing agent with the protein material prior to exposure of the protein material to acidic aqueous conditions at or near the isoelectric point of the protein maximizes the stability of the suspension of protein material at or near the isoelectric point of the protein as a result of facilitating the association of the protein material and the high methoxyl pectin and/or the propylene glycol alginate. The high methoxyl pectin and/or the propylene glycol alginate may be added to the aqueous hydrating solution as a dry mixture with the protein material, either a dry-blend or a dry material in which the protein material is complexed with the high methoxyl pectin and the propylene glycol alginate as described above, or the high methoxyl pectin and/or propylene glycol alginate may be added to the aqueous hydrating solution separately from the protein material. If added separately, the high methoxyl pectin and the propylene glycol alginate may be added dry, separately or as a blend, to the aqueous hydrating solution containing the protein material, or either (or both) of the high methoxyl pectin and propylene glycol alginate components of the protein stabilizing agent may be hydrated in a separate aqueous solution that is subsequently combined with the aqueous hydrating solution containing the protein material.

The aqueous hydrating solution containing the protein material, and the high methoxyl pectin and/or propylene glycol alginate if such have been added thereto, is vigorously mixed to fully disperse and hydrate the protein material and any protein stabilizing agent components and to maximize the association of the protein material with the high methoxyl pectin and/or the propylene glycol alginate if the protein stabilizing agent components are present in the solution. The hydrating solution may be mixed with conventional equipment for mixing protein slurries or solutions, including blenders and high shear mixers. The hydrating solution should be mixed for a period of time sufficient to remove all lumps and aggregates of the protein material and the high methoxyl pectin and/or propylene glycol alginate protein stabilizing agent components, typically from 5 minutes to 30 minutes, and preferably from 10 minutes to 15 minutes.

The temperature of the hydrating solution may be adjusted, if desired, to speed the hydration of the protein material and any protein stabilizing agent components. Preferably the temperature of the hydrating solution is adjusted to a temperature of from 150° F.–180° F. (65° C. to 82° C.).

After hydration of the protein material and any of the protein stabilizing agent components in the hydrating solution, non-acidic flavoring agents, defoamers, coloring agents, nutrients, and sweeteners may be added to the aqueous hydrating solution prior to adjusting the pH of the hydrating solution to a pH of 3.0 to 5.5. Non-acidic flavoring agents include commercially available natural and artificial flavors, and coloring agents may be commercially available natural and artificial colorants. Preferred sweeteners are carbohydrates such as sucrose and fructose. Preferred nutrients include vitamins and minerals.

After addition of the flavoring agents, coloring agents, defoamers, nutrients, and sweeteners to the aqueous hydrating solution mixing of the hydrating solution is continued until the added components are thoroughly mixed in the hydrating solution. If the temperature of the hydrating solution has not already been adjusted, the temperature of the hydrating solution may be increased when mixing the added components to ensure that the ingredients in the hydrating solution are optimally mixed. Preferably the temperature of the hydrating solution is raised to 150° F. to 180° F. (65° C. to 82° C.).

After the protein material and protein stabilizing agent components high methoxyl pectin and propylene glycol alginate, if any, are hydrated in the hydrating solution and any desired flavoring agents, coloring agents, defoamers, sweeteners, and nutrients are mixed in the hydrating solution, the hydrating solution is adjusted to a pH of from 3.0 to 5.5 to form the aqueous acidic protein suspension. If the hydrating solution has a pH of greater than 5.5, the hydrating solution may be acidified to the desired pH by adding an acidulent such as an edible acid (e.g. lactic acid, citric acid, phosphoric acid) to the hydrating solution, by mixing the hydrating solution with an acidic liquid such as a fruit or a vegetable juice, by mixing the hydrating solution with an acidic fruit or vegetable juice concentrate, or by combinations such methods. Most preferably, the hydrating solution containing the protein material and other ingredients is acidified to a pH other than the isoelectric point of the protein material to avoid maximum insolubility of the protein in the acidified solution.

If the hydrating solution has a pH of less than 3.0, the hydrating solution may be made more basic by adding a base, preferably a dilute alkaline solution such as an aqueous sodium hydroxide solution, or by adding sufficient quantities of a juice or juice concentrate to raise the pH of the hydrating solution to a pH of from 3.0 to 5.5. Most preferably, the pH of the hydrating solution containing the protein material and other ingredients is adjusted to a pH other than the isoelectric point of the protein material to avoid maximum insolubility of the protein in the solution.

In one embodiment of the invention, the hydrating solution containing the hydrated protein and other ingredients is mixed with a juice or a juice concentrate to provide an aqueous acidic liquid beverage. Preferred fruit and vegetable juices and juice concentrates include apple juice, grape juice, orange juice, carrot juice, lemon juice, lime juice, grapefruit juice, pineapple juice, cranberry juice, peach juice, pear juice, celery juice, cherry juice, tomato juice, passionfruit juice, blends thereof, and their concentrates. If the desired pH of the aqueous acidic liquid beverage is lower than the pH provided by mixing the juice and/or juice concentrate with the hydrating solution, the pH may be further lowered by adding an edible acidulent to the mixture. Preferred edible acidulents include citric acid, lactic acid, and phosphoric acid.

In another embodiment of the invention the hydrating solution containing the hydrated protein and other ingredients is acidified by adding a sufficient amount of one or more edible acidulents to the hydrating solution to adjust the pH of the hydrating solution to the desired acid pH. As noted above, preferred edible acidulents include citric acid, lactic acid, and phosphoric acid.

Adjustment of the pH of the aqueous hydrating solution containing the protein material and other ingredients is preferably done quickly with sufficient mixing to homogenize the pH of the resulting liquid suspension. If the pH of the hydrating solution is to be lowered below or raised above the isoelectric point of the protein it is desirable to adjust the pH of the solution as quickly as reasonably possible through the isoelectric pH of the protein to minimize the time that the solution is maintained at the pH at which the protein material is least soluble.

Although it is preferred to add the high methoxyl pectin and the propylene glycol alginate of the protein stabilizing agent to the aqueous hydrating solution with the protein material prior to adjusting the pH of the solution to a pH of from 3.0 to 5.5, the high methoxyl pectin and/or the propylene glycol alginate may be mixed together with the hydrated protein material at the time the pH of the hydrating solution containing the hydrated protein material is adjusted. If the high methoxyl pectin and/or the propylene glycol alginate is/are mixed with the protein material when the pH of the hydrating solution is adjusted, the hydrating solution must be vigorously mixed to ensure sufficient contact of the protein stabilizing agent components and the protein material to prevent agglomeration and sedimentation of the protein material from the pH adjusted solution.

The combined amount of high methoxyl pectin and propylene glycol alginate of the protein stabilizing agent—whether combined with the protein material before addition of the protein material to the hydrating solution, after addition of the protein material to the hydrating solution but before adjusting the pH of the solution, or at the time of the pH adjustment of the hydrating solution—must be effective to maintain the protein material suspended in the pH adjusted solution. Preferably the combined weight of the high methoxyl pectin and the propylene glycol alginate (the weight of the protein stabilizing agent) in the aqueous acidic protein suspension is from 10% to 70% (0.1:1 to 0.7:1) of the weight of the protein material in the suspension, where the ratio of high methoxyl pectin to propylene glycol alginate of the protein stabilizing agent is from 0.5:1 to 3.5:1, by weight. Most preferably, the combined weight of the high methoxyl pectin and the propylene glycol alginate (the weight of the protein stabilizing agent) is from 25% to 35% (0.25:1 to 0.35:1) of the weight of the protein material, and the ratio of high methoxyl pectin to propylene glycol alginate, by weight, is from 0.75:1 to 1.5:1.

After the formation of the aqueous acidic protein suspension, it is preferable to subject to suspension to vigorous mixing to homogenize the suspension. Homogenization eliminates protein aggregates that may have formed in the suspension upon acidification and further facilitates interaction between the protein material, the high methoxyl pectin, and the propylene glycol alginate. The suspension is preferably homogenized in a conventional homogenizer at pressures of from 1500 psi to 3500 psi.

The homogenized suspension may be pasteurized, if desired, to eliminate any microbial contamination of the suspension. The homogenized suspension is preferably pasteurized with conventional pasteurization equipment at a temperature of from 175° F. to 195° F. (80° C. to 90° C.) for 0.5 to 3 minutes.

The following examples are illustrative of the invention.

EXAMPLE 1

An acidic grape flavored beverage is formulated as follows. 160 liters of water is added to a high shear mixer. Separately, 6.25 kg of SUPRO PLUS 675 soy protein isolate (3.25% of the composition, by weight) is dry-blended with 430 grams of Hercules YM100L high methoxyl pectin and 430 grams of Kelcoloid S propylene glycol alginate (0.26:1 HMP+PGA to protein material, by weight). The dry-blend mix of soy protein isolate, high methoxyl pectin, and propylene glycol alginate is added to the water and dispersed by mixing in the high shear mixer. After the soy protein isolate, high methoxyl pectin, and propylene glycol alginate are well dispersed, the dispersion is heated to 170° F.(77° C.) and held for 15 minutes. Then 19.2 kg of sucrose, 400 g of flavor and colorant, and 4 kg of white grape juice concentrate are added to the protein/high methoxyl pectin/propylene glycol alginate dispersion, and the solution is mixed for another 10 minutes. The pH of the solution is then adjusted to acidic by adding 787 g of citric acid (granulated) and 518 ml of phosphoric acid (85%) while continuously mixing the solution. The acidified solution is homogenized in a homogenizer at 2000 psi and is pasteurized at 195° F. (91° C.) for 2 minutes. The solution is allowed to cool to provide the acidic grape flavored beverage that provides 6.25 g of protein per 8 ounce serving.

EXAMPLE 2

An acidic grape flavored beverage is formulated as follows. 164 liters of water is added to a high shear mixer. Separately, 3 kg of casein (1.56% of the composition, by weight) is dry-blended with 240 grams of Hercules YM100L high methoxyl pectin and 240 grams of Kelcoloid S propylene glycol alginate (0.3:1 HMP+PGA to protein material, by weight). The dry-blend mix of casein, high methoxyl pectin and propylene glycol alginate is added to the water and dispersed therein by the mixing in the high shear mixer. After the casein, high methoxyl pectin, and propylene glycol alginate are well dispersed, the dispersion is heated to 170° F.(77° C.) and held for 15 minutes. Then 19.2 kg of sucrose, 400 g of flavor and colorant, and 4 kg of white grape juice concentrate are added to the protein/high methoxyl pectin/ propylene glycol alginate dispersion, and the solution is mixed for another 10 minutes. The pH of the solution is then adjusted to acidic by adding 438 g of citric acid (granulated) and 192 ml of phosphoric acid (85%) while continuously mixing the solution. The acidified solution is homogenized in a homogenizer at 2000 psi and is pasteurized at 195° F. (91° C.) for 2 minutes. The solution is allowed to cool to provide the acidic grape flavored beverage that provides 3 g of protein per 8 ounce serving.

EXAMPLE 3

An acidic apple flavored beverage is formulated as follows. 164 liters of water is added to a high shear mixer.

Separately, 3 kg of wheat gluten (1.56% of the composition, by weight) is dry-blended with 240 grams of Hercules YM100L high methoxyl pectin and 240 grams of Kelcoloid S propylene glycol alginate (0.3:1 HMP+PGA to protein material, by weight). The dry-blend mix of wheat gluten, high methoxyl pectin and propylene glycol alginate is added to the water and dispersed therein by mixing in the high shear mixer. The dispersion is heated to 170° F. (77° C.) and held for 15 minutes. Then 19.2 kg of sucrose, 400 g of flavor and colorant, and 4 kg of apple juice concentrate are added to the wheat gluten/high methoxyl pectin/propylene glycol alginate dispersion, and the solution is mixed for another 10 minutes. The pH of the solution is then adjusted to acidic by adding 438 g of citric acid (granulated) and 192 ml of phosphoric acid (85%) while continuously mixing the solution. The acidified solution is homogenized in a homogenizer at 2000 psi and is pasteurized at 195° F. (91° C.) for 2 minutes. The solution is allowed to cool to provide the acidic apple flavored beverage.

EXAMPLE 4

An acidic grape flavored beverage is formulated as follows. 160 liters of water is added to a high shear mixer. Separately, 6.25 kg of zein (3.25% of the composition, by weight) is dry-blended with 430 grams of Hercules YM100L high methoxyl pectin and 430 grams of Kelcoloid S propylene glycol alginate (0.26:1 HMP+PGA to protein material, by weight). The dry-blend mix of zein, high methoxyl pectin and propylene glycol alginate is added to the water and dispersed therein by mixing in the high shear mixer. After the zein, high methoxyl pectin, and propylene glycol alginate are dispersed, the dispersion is heated to 170° F.(77° C.) and held for 15 minutes. Then 19.2 kg of sucrose, 400 g of flavor and colorant, and 4 kg of white grape juice concentrate are added to the protein/high methoxyl pectin/propylene glycol alginate dispersion, and the solution is mixed for another 10 minutes. The pH of the solution is then adjusted to acidic by adding 787 g of citric acid (granulated) and 518 ml of phosphoric acid (85%) while continuously mixing the solution. The acidified solution is homogenized in a homogenizer at 2000 psi and is pasteurized at 195° F. (91° C.) for 2 minutes. The solution is allowed to cool to provide the acidic grape flavored beverage.

EXAMPLE 5

An aqueous acid suspendible protein composition is formed as follows. A protein material is complexed with a protein stabilizing agent formed of high methoxyl pectin and propylene glycol alginate. 160 liters of water is added to a high shear mixer. Separately, 6.25 kg of SUPRO PLUS 675 soy protein isolate is dry-blended with 430 grams of Hercules YM100L high methoxyl pectin and 430 grams of Kelcoloid S propylene glycol alginate (0.26:1 HMP+PGA to protein material, by weight). The dry-blend mix of soy protein isolate, high methoxyl pectin and propylene glycol alginate is added to the water and dispersed therein by mixing in the high shear mixer. The dispersion is then heated to 170° F.(77° C.) and held for 10 minutes. The aqueous dispersion of soy protein isolate, high methoxyl pectin, and propylene glycol alginate is then spray-dried to form the complexed protein material/protein stabilizing agent in which the soy protein isolate is complexed with the high methoxyl pectin and the propylene glycol alginate.

EXAMPLE 6

An aqueous acid suspendible protein composition is formed as follows. A protein material is dry-blended with a protein stabilizing agent formed of a high methoxyl pectin and a propylene glycol alginate. 31.2 kilograms of casein, 4 kilograms of Hercules YM 100L high methoxyl pectin, and 4 kilograms of Kelcoloid S propylene glycol alginate are placed in a drum mixer. The dry components are thoroughly mixed in the drum mixer for 10 minutes to form a blended suspendible protein composition containing a 3.9:1 ratio of protein to protein stabilizing agent, by weight.

EXAMPLE 7

A protein stabilizing agent for use in stabilizing a protein material in an aqueous acidic liquid is formed as follows. 4.5 kilograms of Hercules YM 100L high methoxyl pectin and 4 kilograms of Kelcolid S propylene glycol alginate are dispersed in 48.1 liters of distilled water in a high shear mixer. The solution is heated to 150° F. and is mixed for 15 minutes. The resulting dispersion is spray-dried to provide the protein stabilizing agent.

EXAMPLE 8

A protein stabilizing agent for use in stabilizing a protein material in an aqueous acidic liquid is formed as follows. 3.0 kilograms of Hercules YM 100L high methoxyl pectin and 4 kilograms of Kelcoloid S propylene glycol alginate are added to a drum mixer. The dry components are blended in the mixer for 10 minutes to provide the protein stabilizing agent.

EXAMPLE 9

The stability of the high methoxyl pectin/propylene glycol alginate protein stabilizing agent of the present invention is compared with a high methoxyl pectin/sodium alginate protein stabilizing agent and with a high methoxyl pectin protein stabilizing agent to determine the relative stabilizing effects of the protein stabilizing agents on an acidic beverage containing 1.56% soy protein isolate at pH 3.8 at a concentration of 0.2%, by weight, of the protein stabilizing agent.

A beverage containing 0.2%, by weight, of the high methoxyl pectin/propylene glycol alginate protein stablizing agent ("HMP/PGA beverage") is formed by the following steps.

1. A protein solution containing 6.5% soy protein isolate, by weight on an "as is" basis, is formed by dispersing 650 grams of SUPRO PLUS 675 soy protein isolate in 9350 grams of distilled water. The protein is hydrated in the solution by stirring the protein solution at 170° F. for 10 minutes.

2. A protein stablizing agent solution containing 3.0% protein stabilizing agent, by weight on an "as is" basis, is formed by dispersing 30 grams of Hercules YM 100L high methoxyl pectin and 30 grams Kelcoloid S propylene glycol alginate in 1940 grams of distilled water. The high methoxyl pectin and the propylene glycol alginate are hydrated in the solution by stirring the solution at 170° F. for 10 minutes.

3. 480 grams of the protein solution, 133.33 grams of the protein stabilizing agent solution, 0.2 grams of Dow Defoamer, and 1178 grams of distilled water are added together and mixed well for 5 minutes.

4. 200 grams of sugar is added to the solution containing the protein, the protein stabilizing agent and the defoamer, and mixing is continued for 5 minutes to disperse the sugar into the solution.

5. The solution is acidified to pH 3.85 by adding 1 gram of 85% phosphoric acid and 7.4 grams of granular citric acid. The solution is stirred continuously while adding the phosphoric and citric acids. After the acids have been added to the solution the solution is heated to 195° F. (95° C.) and held at that temperature for 1 minute.

6. The solution is then homogenized, a first stage of homogenization being conducted at 2500 psi, and a second stage of homogenization being conducted at 500 psi.

7. The solution is then cooled to provide the acidic protein containing beverage.

The HMP/PGA beverage has a total weight of 2000 grams and contains 31.2 grams of soy protein isolate (1.56%, by weight), 4 grams of protein stabilizing agent (0.2%, by weight) containing 2 grams of high methoxyl pectin (0.1%, by weight) and 2 grams of propylene glycol alginate (0.1%, by weight), 200 grams of sugar (10.0%, by weight), 0.2 grams of Dow Defoamer (0.01%, by weight), 1 gram of 85% phosphoric acid (0.05%, by weight), and 7.4 grams of citric acid (0.37%, by weight).

A second acidic protein containing beverage containing 0.2% of a protein stabilizing agent formed of high methoxyl pectin and sodium alginate (the "HMP/SA beverage") is formulated in accordance with steps 1–7 above, except that 30 grams of sodium alginate are used in place of propylene glycol alginate in step 2. The HMP/SA beverage has a composition similar to the HMP/PGA beverage except that the HMP/SA beverage contains 2 grams of sodium alginate instead of 2 grams of propylene glycol alginate.

A third acidic beverage containing 0.2% of a protein stabilizing agent formed solely of high methoxyl pectin (the "HMP" beverage) is formulated in accordance with the following steps.

1. 4 grams of Hercules YM 100L high methoxyl pectin is dry-blended with 12 grams of sugar.

2. The high methoxyl pectin/sugar dry-blend, 31.2 grams of SUPRO PLUS 675 isolated soy protein, and 0.2 grams of Dow Defoamer are dispersed and mixed in 1756.8 grams of distilled water over a period of three minutes to form a protein/protein stabilizing agent solution.

3. The protein/protein stabilizing agent solution is hydrated by mixing the solution at 170° F. for 10 minutes.

4. 188 grams of sugar is dispersed in the hydrated protein/protein stabilizing agent solution.

5. The pH of the protein/protein stabilizing agent solution is adjusted to pH 3.85 by adding 1 gram of 85% phosphoric acid and 6.8 grams of granular citric acid while continuously mixing the solution.

6. The acidified solution is heated to 195° F. and held for 1 minute, and then is homogenized in a 2-stage homogenization process-the first homogenization stage being conducted at 2500 psi and the second homogenization stage being conducted at 500 psi.

7. The solution is then cooled to provide the acidic HMP beverage.

The HMP beverage has a total weight of 2000 grams and contains 31.2 grams of soy protein isolate (1.56%, by weight), 4 grams of high methoxyl pectin protein stabilizing agent (0.2%, by weight), 200 grams of sugar (10.0%, by weight), 0.2 grams of Dow Defoamer (0.01%, by weight), 1 gram of 85% phosphoric acid (0.05%, by weight), and 6.8 grams of citric acid (0.34%, by weight).

Six samples each of the HMP/PGA beverage, the HMP/SA beverage, and the HMP beverage are formed by filling six 250 milliliter narrow mouth square bottles (Nalge Nunc International) with each beverage. The samples are cooled to 4° C. and held at that temperature for 24 hours. The percentage of sediment and percentage of serum of each sample is then measured to determine the effectiveness of the protein stabilizing agent in each beverage (Sediment= solid material that has fallen out of solution/suspension; Serum=clear layer of solution containing little or no suspended protein). The percentage of sediment is determined by measuring the height of the sediment layer in the sample and measuring the height of the entire sample, where Percent Sediment=(Ht. Sediment layer)/(Ht. Total Sample)×100. The percentage of serum is determined by measuring the height of the serum layer in the sample and measuring the height of the entire sample, where Percent Serum=(Ht. Serum Layer)/(Ht. Total Sample)×100. The average amount of Percent Sediment and Percent Serum of the six samples of each beverage is determined by summing the Percent Sediment of each separate beverage sample and dividing by six to calculate the average Percent Sediment, and by summing the Percent Serum of each separate beverage sample and dividing by six to calculate the average Percent Serum. Visual observations are also made with respect to the homogenity, or lack thereof, of the samples. The results of the tests are shown in Table 1 below.

TABLE 1

|  | HMP/PGA | HMP/SA | HMP |
| --- | --- | --- | --- |
| pH | 3.79 | 3.81 | 3.73 |
| % Sediment | 1.6 | 46.1 | 53.5 |
| % Serum | 0.0 | 53.9 | 46.5 |
| Observation | Homogenous | 2 Phases | 2 Phases |

The tests show that the only effective protein stabilizing agent at 0.2% (at one part of protein stabilizing agent per 7.8 parts of protein material) is the high methoxyl pectin/propylene glycol alginate stabilizing agent of the present invention, and that the high methoxyl pectin/sodium alginate and high methoxyl pectin protein stabilizing agents are ineffective to stabilize the protein in a homogenous solution. The low percent of sediment present in the HMP/PGA samples indicates that the protein stabilizing agent maintains the protein in suspension in the acidic environment, while, conversely, the high percentage of sediment present in the HMP/SA and HMP samples indicates that the HMP/SA and HMP protein stabilizing agents are not as effective as the HMP/PGA protein stabilizing agent at maintaining the protein in suspension.

EXAMPLE 10

The stability of the high methoxyl pectin/propylene glycol alginate protein stabilizing agent of the present invention is compared with a high methoxyl pectin/sodium alginate protein stabilizing agent, with a high methoxyl pectin protein stabilizing agent, and with a propylene glycol alginate protein stabilizing agent to determine the relative stabilizing effects of the protein stabilizing agents on an acidic beverage containing 1.56% soy protein isolate at pH 3.8 at a concentration of 0.35%, by weight, of the protein stabilizing agent. The experiment is similar to the experiment of Example 9 above, except that a higher level of the protein stabilizing agent is used in the samples and a sample containing only propylene glycol alginate as a protein stabilizing agent is added for comparison.

An acidic beverage containing 0.35% high methoxyl pectin/propylene glycol alginate as a protein stabilizing agent (the "HMP/PGA" beverage) is prepared as follows.

1. A protein solution containing 6.5% soy protein isolate, by weight on an "as is" basis, is formed by dispersing 650 grams of SUPRO PLUS 675 soy protein isolate in 9350 grams of distilled water. The protein is hydrated in the solution by stirring the protein solution at 170° F. for 10 minutes.

2. A protein stablizing agent solution containing 3.0% protein stabilizing agent, by weight on an "as is" basis, is formed by dispersing 30 grams of Hercules YM 100L high methoxyl pectin and 30 grams Kelcoloid S propylene glycol alginate in 1940 grams of distilled water. The high methoxyl pectin and the propylene glycol alginate are hydrated in the solution by stirring the solution at 170° F. for 10 minutes.

3. 1200 grams of the protein solution, 583.33 grams of the protein stabilizing agent solution, 0.5 grams of Dow Defoamer, and 2700 grams of distilled water are added together and mixed well for 5 minutes.

4. 500 grams of sugar is added to the solution containing the protein, the protein stabilizing agent and the defoamer, and mixing is continued for 5 minutes to disperse the sugar into the solution.

5. The solution is acidified to pH 3.85 by adding 2.5 grams of 85% phosphoric acid and 13.5 grams of granular citric acid. The solution is stirred continuously while adding the phosphoric and citric acids. After the acids have been added to the solution the solution is heated to 195° F. (95° C.) and held at that temperature for 1 minute.

6. The solution is then homogenized, a first stage of homogenization being conducted at 2500 psi, and a second stage of homogenization being conducted at 500 psi.

7. The solution is then cooled to provide the acidic protein containing beverage.

The HMP/PGA beverage has a total weight of 5000 grams and contains 78 grams of soy protein isolate (1.56%, by weight), 17.5 grams of protein stabilizing agent (0.35%, by weight) containing 8.75 grams of high methoxyl pectin (0.175%, by weight) and 8.75 grams of propylene glycol alginate (0.175%, by weight), 500 grams of sugar (10.0%, by weight), 0.5 grams of Dow Defoamer (0.01%, by weight), 2.5 grams of 85% phosphoric acid (0.05%, by weight), and 13.5 grams of citric acid (0.27%, by weight).

A second acidic protein containing beverage containing 0.35% of a protein stabilizing agent formed of high methoxyl pectin and sodium alginate (the "HMP/SA beverage") is formulated in accordance with steps 1–7 above, except that 30 grams of sodium alginate are used in place of propylene glycol alginate to formulate the protein stabilizing agent solution in step 2. The HMP/SA beverage has a composition similar to the HMP/PGA beverage except that the HMP/SA beverage contains 8.75 grams of sodium alginate instead of 8.75 grams of propylene glycol alginate.

A third acidic protein containing beverage containing 0.35% of a protein stabilizing agent formed solely of high methoxyl pectin (the "HMP" beverage) is formulated in accordance with steps 1–7 above, except that 17.5 grams of high methoxyl pectin is used to formulate the protein stabilizing agent solution in step 2, rather than 8.75 grams of high methoxyl pectin and 8.75 grams of propylene glycol alginate.

A fourth acidic protein containing beverage containing 0.35% of a protein stabilizing agent formed solely of propylene glycol alginate (the "PGA" beverage) is formulated in accordance with steps 1-7 above, except that 17.5 grams of propylene glycol alginate is used to formulate the protein stabilizing agent solution in step 2, rather than 8.75 grams of high methoxyl pectin and 8.75 grams of propylene glycol alginate.

Six samples each of the HMP/PGA beverage, HMP/SA beverage, the HMP beverage, and the PGA beverage are formed by filling six 250 milliliter narrow mouth square bottles (Nalge Nunc International) with each beverage. The samples are cooled to 4° C. and held at that temperature for 24 hours. The percentage of sediment and percentage of serum of each sample is then measured to determine the effectiveness of the protein stabilizing agent in each beverage (Sediment=solid material that has fallen out of solution/suspension; Serum=clear layer of solution containing little or no suspended protein). The percentage of sediment is determined by measuring the height of the sediment layer in the sample and measuring the height of the entire sample, where Percent Sediment=(Ht. Sediment layer)/(Ht. Total Sample)×100. The percentage of serum is determined by measuring the height of the serum layer in the sample and measuring the height of the entire sample, where Percent Serum=(Ht. Serum Layer)/(Ht. Total Sample)×100. The average amount of Percent Sediment and Percent Serum of the six samples of each beverage is determined by summing the Percent Sediment of each separate beverage sample and dividing by six to calculate the average Percent Sediment and by summing the Percent Serum of each separate beverage sample and dividing by six to calculate the average Percent Serum. Visual observations are also made with respect to the homogenity, or lack thereof, of the samples. The results of the tests are shown in Table 2 below.

TABLE 2

|  | HMP/PGA | HMP/SA | HMP | PGA |
|---|---|---|---|---|
| pH | 3.89 | 3.93 | 3.92 | 3.77 |
| % Sediment | 1.6 | 65.6 | 3.2 | 49.0 |
| % Serum | 0 | 34.4 | 0.0 | 51.0 |
| Observations | Homogenous | 2 Phases | Homogenous | 2 Phases |

The tests show that both the high methoxyl pectin/propylene glycol alginate protein stabilizing agent of the present invention and the high methoxyl pectin protein stabilizing agent are effective to stabilize an acidic protein suspension at the higher 0.35% concentration (at 1 part of protein stabilizing agent per 7.8 parts of protein material). High methoxyl pectin/sodium alginate and propylene glycol alginate protein stabilizing agents are ineffective to stabilize the protein in a homogenous solution even at the higher 0.35% concentration of protein stabilizing agent. The low percent of sediment present in the HMP/PGA and HMP samples indicates that the protein stabilizing agent maintains the protein in suspension in the acidic environment, while, conversely, the high percentage of sediment present in the HMP/SA and PGA samples indicates that the HMP/SA and PGA protein stabilizing agents are not as effective at maintaining the protein in suspension.

EXAMPLE 11

The relative viscosities of the 0.2% and 0.35% HMP/PGA and HMP samples prepared in Examples 9 and 10 above are compared. The viscosities of the 0.2% and 0.35% HMP/PGA and HMP samples prepared in Examples 9 and 10 are measured using a Brookfield viscometer (available from Brookfield Engineering Laboratories, Stoughton, Mass., U.S.), equipped with a S-18 spindle at 60 rpm and a temperature of 25° C. The results are shown in Table 3 below.

TABLE 3

| | HMP/PGA .2% | HMP .2% | HMP/PGA .35% | HMP .35% |
|---|---|---|---|---|
| Viscosity (cps) | 3.18 | 4.44 | 5.0 | 5.6 |

The results of comparing the relative viscosities of the high methoxyl pectin/propylene glycol alginate protein stabilizing agent of the present invention with a high methoxyl pectin stabilizing agent show that an aqueous suspension containing the HMP/PGA protein stabilizing agent has a lower viscosity than an aqueous suspension containing the HMP stabilizing agent at the same concentrations of stabilizing agent. More significantly, however, as shown in Examples 9 and 10 above, the HMP/PGA protein stabilizing agent is effective at stabilizing protein at a concentration of 0.2% while the HMP protein stabilizing agent is not, therefore, a lower viscosity can be obtained with effective protein suspension using the HMP/PGA stabilizing agent at 0.2%. The viscosity of an aqueous protein suspension containing the HMP/PGA protein stabilizing agent at a concentration of 0.2% is much lower than the viscosity of an aqueous protein suspension containing the HMP protein stabilizing agent at a concentration of 0.35%.

Additional embodiments become readily apparent in view of the present invention as described above. Various modifications of the techniques, procedures, and compositions, and materials may be apparent to those skilled in the art from the description of the invention above. It is intended that all such variations within the scope and spirit of the appended claims be embraced thereby.

What is claimed is:

1. A method for stabilizing protein in an aqueous acidic liquid comprising mixing a hydrated protein material and a protein stabilizing agent comprised of a high methoxyl pectin and a propylene glycol alginate in an aqueous acidic liquid having a pH of from 3.0 to 5.5.

2. The method of claim 1 wherein:
   said protein material is hydrated in an aqueous liquid having a pH greater than 5.5 or less than 3.0 prior to mixing said protein material in said aqueous acidic liquid having a pH of from 3.0 to 5.5; and
   after said protein material is hydrated in said aqueous liquid having a pH of greater than 5.5 or less than 3.0 the pH of said aqueous liquid is adjusted to a pH of from 3.0 to 5.5 to form said aqueous acidic liquid.

3. The method of claim 2 wherein at least one of said high methoxyl pectin and said propylene glycol alginate of said protein stabilizing agent is mixed with said protein material in said aqueous liquid having a pH of greater than 5.5 or less than 3.0 prior to being mixed in said aqueous acidic liquid having a pH of from 3.0 to 5.5.

4. The method of claim 1 wherein said protein material is selected from the group consisting of soy protein isolate and casein.

5. The method of claim 1 wherein said high methoxyl pectin and said propylene glycol alginate of said protein stabilizing agent are mixed in said aqueous acidic liquid in a ratio of from 0.5:1 to 3.5:1 high methoxyl pectin to propylene glycol alginate, by weight.

6. The method of claim 1 wherein said protein stabilizing agent mixed in said aqueous acidic liquid is present in said aqueous acidic liquid in an amount of from 10% to 70%, by weight, of said protein material in said aqueous acidic liquid.

7. The method of claim 1 wherein said aqueous acidic liquid is a fruit juice or a vegetable juice.

8. A method of forming a stable suspension of protein material in an acidic juice comprising:
   hydrating a protein material; and
   contacting said hydrated protein material in an acidic juice or an aqueous acidic solution containing a juice concentrate with an amount of a protein stabilizing agent effective to stabilize said protein in said juice or aqueous solution containing a juice concentrate, wherein said protein stabilizing agent is comprised of high methoxyl pectin and propylene glycol alginate.

9. The method of claim 8 wherein said protein stabilizing agent is contacted with said protein material prior to suspending said protein material in said juice or said aqueous solution containing a juice concentrate.

10. The method of claim 8 wherein said protein stabilizing agent is contacted with said protein material simultaneously with suspension of said protein material in said juice or said aqueous solution containing a juice concentrate.

11. The method of claim 8 wherein said high methoxyl pectin and said propylene glycol alginate are present in said protein stabilizing agent in a ratio of from 0.5:1 to 3.5:1, by weight, of high methoxyl pectin to propylene glycol alginate.

12. The method of claim 11 wherein said amount of protein stabilizing agent effective to stabilize said protein material in said juice or said aqueous solution containing a juice concentrate is from 0.1:1 to 0.7:1, by weight, of said protein stabilizing agent to said protein material.

13. The method of claim 9 wherein said amount of protein stabilizing agent effective to stabilize said protein material in said juice or said aqueous solution containing a juice concentrate is from 0.1:1 to 0.7:1, by weight, of said protein stabilizing agent to said protein material.

14. The method of claim 9 wherein said juice is a fruit juice.

15. The method of claim 9 wherein said juice is a vegetable juice.

16. The method of claim 9 wherein said protein material and said stabilizing agent are contacted by blending said protein material and said stabilizing agent together.

17. The method of claim 9 wherein said protein material and said high methoxyl pectin and propylene glycol alginate are contacted by hydrating said protein material together with said high methoxyl pectin and said propylene glycol alginate and co-drying said protein material, said high methoxyl pectin, and said propylene glycol alginate to form a dry complex of said protein material with said high methoxyl pectin and said propylene glycol alginate.

* * * * *